United States Patent [19]
Leonard

[11] Patent Number: 5,854,866
[45] Date of Patent: Dec. 29, 1998

[54] MULTI-LEVEL ARCHITECTURE FOR OPTICAL TIME DELAYS IN INTEGRATED CIRCUITS

[75] Inventor: Jerry Leonard, Plano, Tex.

[73] Assignee: Texas Instruments Incorporated, Dallas, Tex.

[21] Appl. No.: 479,315

[22] Filed: Jun. 7, 1995

Related U.S. Application Data

[62] Division of Ser. No. 404,070, Mar. 14, 1995, abandoned.

[51] Int. Cl.⁶ .............................. G02B 6/26; G02B 6/12
[52] U.S. Cl. ................................ 385/39; 385/14; 385/15; 385/40
[58] Field of Search ................................ 385/14, 15, 16, 385/39, 40, 41, 42, 46, 47, 50, 131, 132, 2, 8

[56] References Cited

U.S. PATENT DOCUMENTS

| | | | |
|---|---|---|---|
| 3,995,311 | 11/1976 | Taylor | 385/15 |
| 5,159,699 | 10/1992 | De Monts | 385/14 |
| 5,222,162 | 6/1993 | Yap et al. | 385/14 |
| 5,367,584 | 11/1994 | Ghezzo et al. | 385/17 |
| 5,394,239 | 2/1995 | Valette | 356/345 |
| 5,465,310 | 11/1995 | Kersten et al. | 385/14 |
| 5,481,633 | 1/1996 | Mayer | 385/14 |

FOREIGN PATENT DOCUMENTS 55-165578  9/1982  Japan .

*Primary Examiner*—Akm E. Ullah
*Assistant Examiner*—Hemang Sanghavi
*Attorney, Agent, or Firm*—Bret J. Petersen; James C. Kesterson; Richard L. Donaldson

[57] ABSTRACT

The present invention provides a method and a circuit for increasing a time delay in an optical signal in an integrated optoelectronic circuit without a proportionate increase in the circuit area. The method uses multiple layers of optical waveguide fabricated in a vertical hierarchy in combination with concentric circular paths. The different sections of the optical waveguide delay line 103, 107 on the multiple layers are connected by electro-optic couplers to pass the optical signal between the sections. In a preferred embodiment, the optical couplers 105, 108 are a poled Electro-Optic (EO) region of cladding 506 allowing the coupler to be electrically addressed. Alternatively, in another embodiment, the couplers 105, 108 may be fabricated with a polymer that is optically nonlinear 406. This type of coupler could be addressed, or activated, by an optical signal, or a component of the optical signal traveling through the coupler.

12 Claims, 1 Drawing Sheet

MULTI-LEVEL ARCHITECTURE FOR OPTICAL TIME DELAYS IN INTEGRATED CIRCUITS

This is a division of application Ser. No. 08/404,070, filed Mar. 14, 1995 now abandoned.

FIELD OF THE INVENTION

The invention relates to integrated optic devices, circuits, microwave antennas and waveguides, and more particularly, to a multilayer optical time delay circuit which can minimize the area used by an optical time delay line on an integrated circuit.

BACKGROUND OF THE INVENTION

It is often necessary in an electro-optic circuit design to implement a delay in a particular signal path. In particular, a delay line network can be used to steer the radar beam in a phased array radar system. This type of radar system utilizes an antenna which is composed of an array of antenna elements that can both receive and send radio frequency (RF) energy. The principle of operation is that an antenna beam points in a direction normal to its phase front. With phased arrays, the phase front is adjusted to steer the beam by individual control of the phase of excitation for each radiating element. This requires a controlled delay between excitation of successive elements in the array. An embodiment of the present invention teaches a method and circuit design to achieve delays of this type.

Typically such delays have been accomplished by sending the signal through a loop in an optical waveguide, with the loop a sufficient length to provide the desired time delay using the natural propagation delay of the signal in the optical waveguide. This method often requires using a very large area on the chip to obtain longer delays. Since area on an integrated circuit is often limited this increased size makes the circuit uneconomical or perhaps unfeasible. An example of this method is disclosed by Yap et al. in U.S. Pat. No. 5,222,162 which includes multiple taps for the single level delay line.

SUMMARY OF THE INVENTION

In accordance with the present invention, a method is provided whereby a time delay for optical signals in an integrated optoelectronic circuit can be implemented without a proportionate increase in the circuit area. The method uses a stacked structure whereby multiple layers of optical waveguide line are fabricated in a vertical hierarchy. The different sections of the optical waveguide delay line on the multiple layers are connected by optoelectronic couplers which pass the optical signal between the layers and the associated optical waveguides.

The use of this method can reduce the cost of the circuit by minimizing the area needed for the circuit. The method also allows the length of the delay to be selectable by controlling the path of the signal though alternative sections of the delay line. This is done by independently controlling the couplers and using both possible outputs of the coupler with different lengths of delay line for each output. This allows the circuit to be more versatile and more cost efficient. The present invention also allows smaller radar electronic packages to be built, saving weight and space as well as providing uses not presently achievable.

This is apparently the first time vertical couplers have been used in conjunction with delay lines in integrated optic devices. The method specifically provides for implementing an optical time delay in an integrated optical circuit, by forming a first delay loop in a first layer of optical waveguide, then forming a second delay loop in a second optical waveguide stacked on the first optical waveguide, and then switching a signal to the second delay loop with a vertical coupler subsequent to traversing the first delay loop.

In a preferred embodiment, the vertical optical couplers are a poled Electro-Optic (EO) region of cladding. The coupler may be addressed, which means to be activated, by placing the coupler region in the presence of an electric field. This causes the region to change in refractive index which allows the optical signal to now pass to an adjacent level of waveguide core.

Alternatively, in another embodiment, the couplers are fabricated with a polymer that is optically nonlinear. This type of material changes in refractive index with the intensity of the optical signal at specific wavelengths. Therefore, this type of coupler could be addressed, or activated, by the optical signal or a component of the optical signal traveling through the coupler.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE DISCLOSURE

Figure 1:
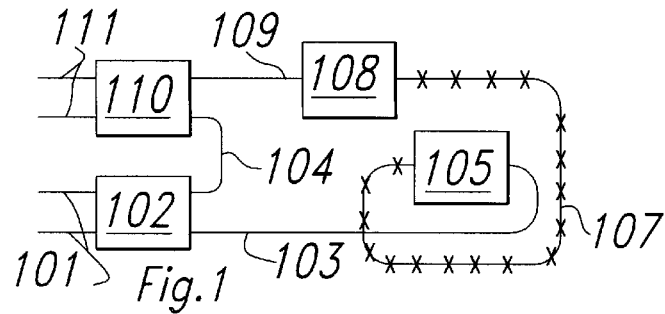
FIG. 1 illustrates a schematic representation of a preferred embodiment.

FIG. 1 illustrates a schematic representation of a preferred embodiment of the present invention. An incoming signal on either input 101 is connected to a first optical switch 102. Switch 102 directs the incoming signal from either of the two inputs 101 to either the waveguide delay line 103 or the waveguide bypass line 104. Delay line 103 is connected to the first vertical coupler 105 on a first layer. Coupler 105 couples the signal from delay line 103 to delay line 107 on a second layer such that delay line 107 may pass over delay line 103. The second vertical optical coupler 108 returns the signal from the lower level waveguide path 107 to waveguide line 109 on the upper layer which is connected to switch 110. Switch 110 selects either of the two outputs 111.

As illustrated, the present invention uses a stacked structure whereby multiple layers of optical waveguide delay line 103, 107 are fabricated in a vertical hierarchy. These two sections of the optical waveguide delay line are connected by electro-optic couplers 105,108 to pass the optical signal between the layers and the associated optical waveguides. These couplers in this first embodiment can be nonswitchable couplers, merely passing the signal from one layer to the other. This method reduces the size and weight of the circuit by minimizing the area needed for the delay circuit.

Figure 2:
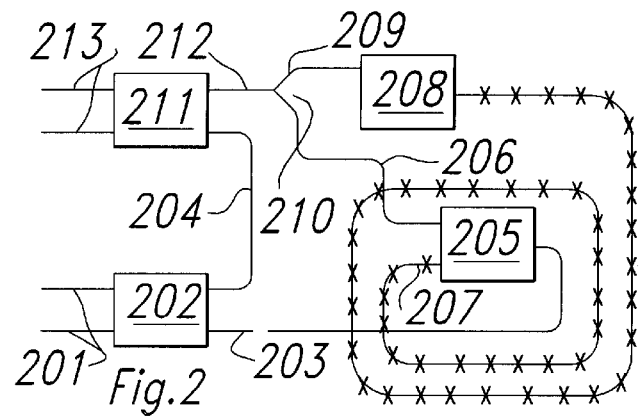
FIG. 2 illustrates a schematic representation of an alternate preferred embodiment.

In another preferred embodiment, shown in FIG. 2, a similar structure as that of FIG. 1 is shown with the additional feature of multiple circular shaped paths or spirals on one of the layers and an additional waveguide bypass line 206. In this embodiment the incoming signal on either input 201 is connected to a first optical switch 202. This switch 202 directs the incoming signal to either the waveguide delay line 203 or the waveguide bypass line 204. Delay line 203 is connected to the first vertical coupler 205, a switchable vertical coupler on a first layer. Coupler 205 switches the signal from waveguide line 203 to waveguide delay line 207 on a second layer or to bypass line 206. Since layers 203 and 207 are on different layers 207 may pass over delay line 203. The second optical coupler 208 directs signals from the delay line 207 to waveguide line 209. Signals in waveguide lines 209 and 206 are combined at y-junction 210 and then carried by waveguide 212 to switch 211. Switch 211 selects either the bypass line 204 or line 212 to pass on either of the outputs of the circuit 213.

The second embodiment allows the length of the delay to be selectable by controlling the path of the signal though alternative paths. The signal could be routed through bypass 204, through delay line 203 and 207 or through delay line 203 and bypass 206. This method allows an additional delay line bit for a phased array radar delay line circuit. This selection of various delay line possibilities is done by independently controlling the switches 202, 211 and couplers 205 and using both possible outputs of the coupler. This method allows the circuit to be more versatile and more cost efficient. This embodiment also illustrates how the method of the present invention may be used to make larger delays with concentric circular paths or spirals.

Figure 3:
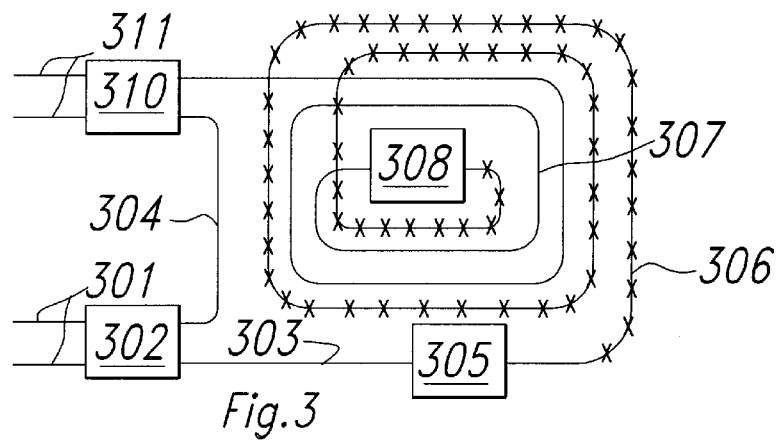
FIG. 3 illustrates a schematic representation of another preferred embodiment.

Yet another preferred embodiment is shown in FIG. 3. This embodiment illustrates how the method of the present invention may be used to make larger delays by using concentric circular paths or spirals on each level of delay line. This is done by making one of the delay lines a spiral path of decreasing radius 306, then coupling the signal to an adjacent layer with a coupler 308 and then making a delay line with a circular spiral of increasing radius 307. While FIG. 3 shows the delay lines 306 and 307 laterally spaced, these lines may be placed to lie directly over one another.

In the present invention and in the preferred embodiments of FIGS. 1, 2 and 3, the switchable vertical couplers may be either of two preferred types. The first preferred type of coupler is implemented with a non-linear optical region of cladding as show in FIG. 4. In this embodiment, the couplers are fabricated with a polymer that is optically nonlinear. A nonlinear photo-optic material changes refractive index with the intensity of the signal at specific wavelengths. Therefore, this type of coupler could be addressed, or activated, by a separate addressing optical signal traveling through the coupler. The structure of this vertical coupler comprises two optical waveguides 401, 402 separated by a cladding layer 403 and bounded by cladding layers 404 and 405. A region of the cladding layer separating the two waveguides 406 comprises a nonlinear optical polymer material. The coupler 400 may be addressed, which means to be activated, by multiplexing with the signal or using a signal which causes the region to change in refractive index thereby allowing the optical signal to now pass to an adjacent level of waveguide core. The lower waveguide core 401 comprises Phosphosilicate glass (PSG) bounded on the lower cladding level by SiO$_2$ cladding 405, and on the upper cladding level by polymer cladding 403. The upper waveguide core 402 comprises a polymer core bounded below by polymer cladding 403 and above by polymer cladding 404.

Figure 5:
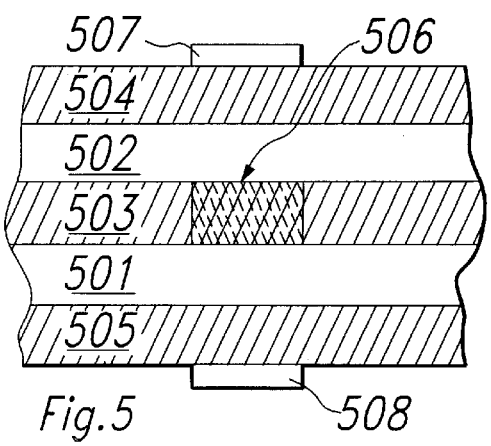
FIG. 5 shows a cross-sectional view of an electrically addressed coupler.

The second preferred type of coupler is implemented with an electro-Optic (EO) region of cladding as show in FIG. 5. The structure of the vertical coupler comprises two optical waveguide cores 501, 502 separated by a cladding layer 503 and bounded by cladding layers 504 and 505. A region of the cladding layer separating the two waveguides operates as a coupler 506 and comprises an electro-optic compound such as a poled electro-optic polymer. The coupler 500 may be addressed, which means to be activated, by placing the coupler region in the presence of an electric field which causes the region to change in refractive index thereby allowing the optical signal to now pass to an adjacent level of waveguide core. The coupler is addressed by applying an electrical field between metal electrodes 507 and 508. The electric field acts to change the refractive index of the region to switch the optical signal to the adjacent level. The lower waveguide core 501 comprises Phosphosilicate glass bounded below by SiO$_2$ cladding 505 and above by polymer cladding 503. The upper waveguide core 502 comprises polymer bounded on either side by polymer cladding 503, 504.

Figure 4:
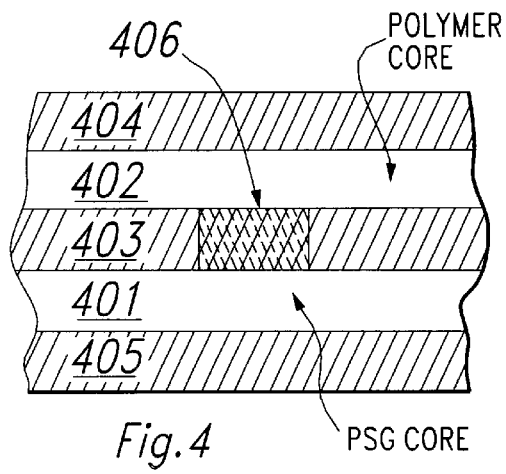
FIG. 4 shows a cross-sectional view of an optically addressed coupler.

In the present invention and in the preferred embodiments of FIGS. 1, 2 and 3, the non-switchable or non-active vertical couplers may be fabricated similar to the switchable optical couplers of FIG. 4. These vertical couplers have the same structure but have the refractive index of the region shown as element 406 chosen such that the optical signal will always couple to the adjacent level. In this case, it is not necessary to include an optical or electrical signal to change the refractive index of the coupling region 406, the signal will always be coupled. Other vertical optical couplers which have various structures could be used to provide coupling to adjacent layers within the scope of the present invention.

The sole Table, below, provides an overview of some embodiments and the drawings.

TABLE

| Element | Specific Name | Generic Name | Alternatives |
|---|---|---|---|
| 101/201 301 | Input Signal Lines | Optical Signal Inputs | |
| 102/110 202/211 302/310 | 2 × 2 Optical Switch | Optical Switch | |
| 103/107 203/207 306/307 | Delay Waveguide | Delay Line | |
| 104/204 304 | Bypass Waveguide | Bypass Waveguide | |
| 105/108 205/208 305/308 | Vertical Optical Coupler | Optical Coupler | |
| 206 | Bypass line | Connecting Waveguide | |
| 109/209 212/303 | Connecting Waveguide | Optical Signal Line | |
| 210 | Y-Junction | Optical Waveguide Junction | |
| 111/213 311 | Outputs | Optical Delay Circuit Outputs | |
| 401/501 | PSG core | Optical Waveguide | |
| 402/502 | Polymer Core | Optical Waveguide | |
| 403/503 | EO Polymer Cladding | Cladding | |
| 405/505 | SiO$_2$ Cladding | Cladding | |
| 404/504 | Polymer cladding | Cladding | SiO$_2$ Cladding |
| 506 | Poled Polymer E–O region | E–O region | Poled Oxide E–O Region |
| 406 | | Non-linear | |

TABLE-continued

| Element | Specific Name | Generic Name | Alternatives |
|---|---|---|---|
| 507/508 | Electrodes | E–O Region Electrodes | |

While this invention has been described with reference to illustrative embodiments, this description is not intended to be construed in a limiting sense. In general the preferred or specific examples are preferred over the other alternate examples, however, it is to be understood that the scope of the invention also comprehends embodiments different from those described, yet within the scope of the claims. It is therefore intended that the appended claims encompass any such modifications or embodiments.

In particular, implementation of the method of this invention is contemplated in discrete components or fully integrated circuits in silicon, germanium, gallium arsenide, or other electronic material families. The method also contemplates multiple layers of optical waveguide even though the embodiments illustrated are limited to two layers. In addition, the shape of the delay loops or paths for the delay lines can be varied to be spirals, ovals, concentric circles or variations or combinations of these shapes.

What is claimed is:

1. An optical time delay structure in an integrated optical circuit comprising:
   (a) a first delay loop in a first optical waveguide layer;
   (b) a second delay loop in a second optical waveguide layer stacked on said first optical waveguide layer, wherein a substantial portion of said second delay loop occupies a plane vertically adjacent to said first delay loop and in at least one region said second delay loop crosses over said first delay loop; and
   (c) a vertical coupler connecting said first delay loop to said second delay loop, such that a signal can be coupled to the second delay loop subsequent to traversing said first delay loop.

2. The optical time delay structure of claim 1, wherein:
   said vertical coupler comprises a non-linear optical region and said coupler is optically addressed and switched by activating said non-linear optical region.

3. The optical time delay structure of claim 1, wherein:
   (a) said vertical coupler comprises an electro-optic polymer cladding; and
   (b) said vertical coupler is electrically addressed and switched by inducing an electric field upon said electro-optic region to switch the optic signal to said second layer.

4. An optical time delay structure in an integrated optical circuit comprising:
   (a) a first plurality of optical delay loops in a substantially spiral shape in a first layer of optical waveguide material;
   (b) a plurality of additional optical delay loops in a substantially spiral shape in a second layer of optical waveguide material adjacent to said first optical waveguide layer, wherein a substantial portion of said second delay loop occupies a plane vertically adjacent to said first delay loop and in at least one region said second delay loop crosses over said first delay loop; and
   (c) a vertical coupler connecting said first plurality of delay loops to said additional plurality of delay loops, such that a signal can be coupled to the second delay loop subsequent to traversing said first delay loop.

5. The optical time delay structure of claim 4, wherein:
   said vertical coupler comprises a non-linear optical region and said coupler is optically addressed and switched by activating said non-linear optical region.

6. The optical time delay structure of claim 4, wherein:
   (a) said vertical coupler comprises an electro-optic polymer cladding; and
   (b) said vertical coupler is electrically addressed and switched by inducing an electric field upon said electro-optic region to switch the optic signal to said second layer.

7. A method for implementing an optical time delay in an integrated optical circuit, said method comprising:
   (a) forming a first delay loop in a first layer of optical waveguide;
   (b) forming a second delay loop in a second optical waveguide stacked on said first optical waveguide, wherein a substantial portion of said second delay loop occupies a plane vertically adjacent to said first delay loop and in at least one region said second delay loop crosses over said first delay loop; and
   (c) coupling a signal to said second delay loop with a vertical coupler subsequent to traversing said first delay loop.

8. The method of claim 7, wherein:
   said vertical coupler comprises a non-linear optical region and said coupler is optically addressed and switched by activating said non-linear optical region.

9. The method of claim 7, wherein:
   (a) said vertical coupler comprises an electro-optic region within a separating cladding; and
   (b) said vertical coupler is electrically addressed and switched by inducing an electric field upon said electro-optic region to switch the optic signal to said second layer.

10. A method for implementing an optical time delay in an integrated optical circuit, said method comprising:
    (a) forming a plurality of delay loops in a substantially spiral shape in a first layer of optical waveguide;
    (b) forming a plurality of additional delay loops in a substantially spiral shape in a second layer of optical waveguide stacked on said first optical waveguide, wherein a substantial portion of said second delay loop occupies a plane vertically adjacent to said first delay loop and in at least one region said second delay loop crosses over said first delay loop; and
    (c) coupling a signal to said additional delay loops with a vertical coupler subsequent to traversing said first layer delay loops.

11. The method of claim 10, wherein:
    said vertical coupler comprises a non-linear optical region and said coupler is optically addressed and switched by activating said non-linear optical region.

12. The method of claim 10, wherein:
    (a) said vertical coupler comprises an electro-optic region within a separating cladding; and
    (b) said vertical coupler is electrically addressed and switched by inducing an electric field upon said electro-optic region to switch the optic signal to said second layer.

* * * * *